Fig. I.

INVENTORS
Willard A. Derr &
Edward J. Cham.

United States Patent Office 2,728,043
Patented Dec. 20, 1955

2,728,043

RECTIFIER SYSTEMS AND PROTECTIVE APPARATUS THEREFOR

Willard A. Derr, Pittsburgh, and Edward J. Cham, Irwin, Pa., assignors to Westinghouse Electric Corporation, East Pittsburgh, Pa., a corporation of Pennsylvania Application December 5, 1952, Serial No. 324,283

10 Claims. (Cl. 321—12)

Our invention relates, generally, to rectifiers, and it has reference, in particular, to apparatus and systems for protecting rectifiers in the event of arc-backs.

Generally stated, it is an object of our invention to provide for using polarity-responsive magnetic amplifiers in a novel manner to effect disconnection of a rectifier upon the occurrence of an arc-back.

More specifically, it is an object of our invention to provide for using magnetic amplifiers to produce direct-current voltages in accordance with the magnitude and polarity of the anode currents of a plurality of rectifiers in a polyphase rectifier system for operating polarity-responsive relays to trip the circuit breaker supplying alternating current to the rectifiers, and also the circuit breaker connecting the rectifier to a direct-current load circuit.

Another object of our invention is to provide for using a polarity-responsive magnetic amplifier to produce a reversible direct-current voltage for selectively controlling the connections of a rectifier in the event of an arc-back and also effecting an indication of misfiring.

It is also an object of our invention to provide for using magnetic amplifiers in the several anode circuits of rectifiers in a polyphase rectifier system for selectively operating polarity-responsive relays to control a common trip relay for the alternating-current and direct-current breakers of the rectifier, and also operate counters to record such operations.

Other objects will in part be obvious, and will in part be explained hereinafter.

In accordance with the teachings of our invention, polarity-responsive magnetic amplifiers are energized from the anode circuits of the several mercury arc rectifiers in a polyphase rectifier system for producing direct-current voltages which are proportional to and directionally related to the anode currents of the rectifiers. Polarity-responsive relays are energized in accordance with these voltages for operating a common trip relay in the event of reversal of any one of the anode currents to trip both the alternating-current circuit breaker connecting the anodes to a source of alternating current and the cathode circuit breaker. For a normal direction of anode current, the polarity-responsive relays provide energizing circuits for indicating lights so that misfiring of any rectifier may be observed.

Figure 1:
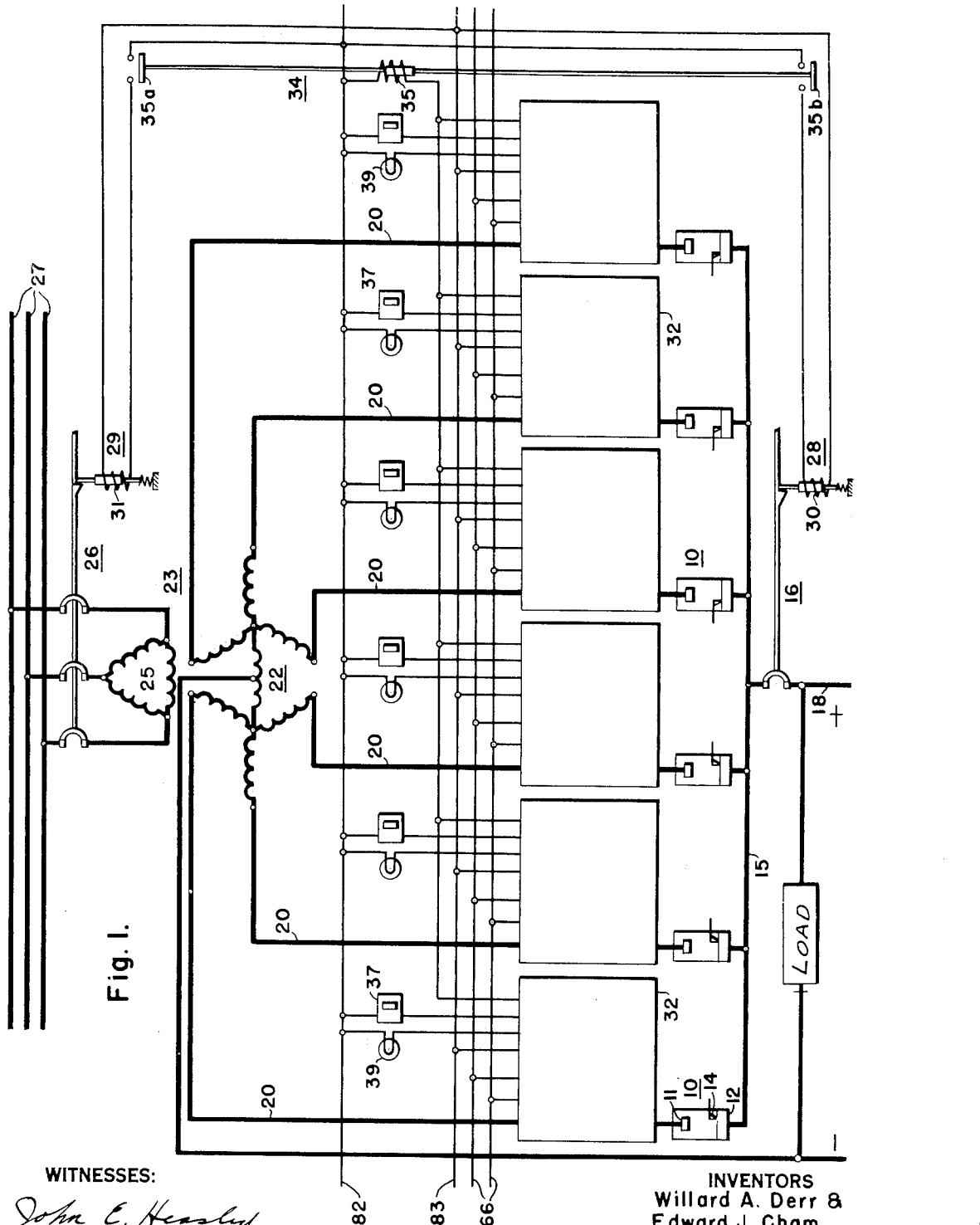
Figure 2:
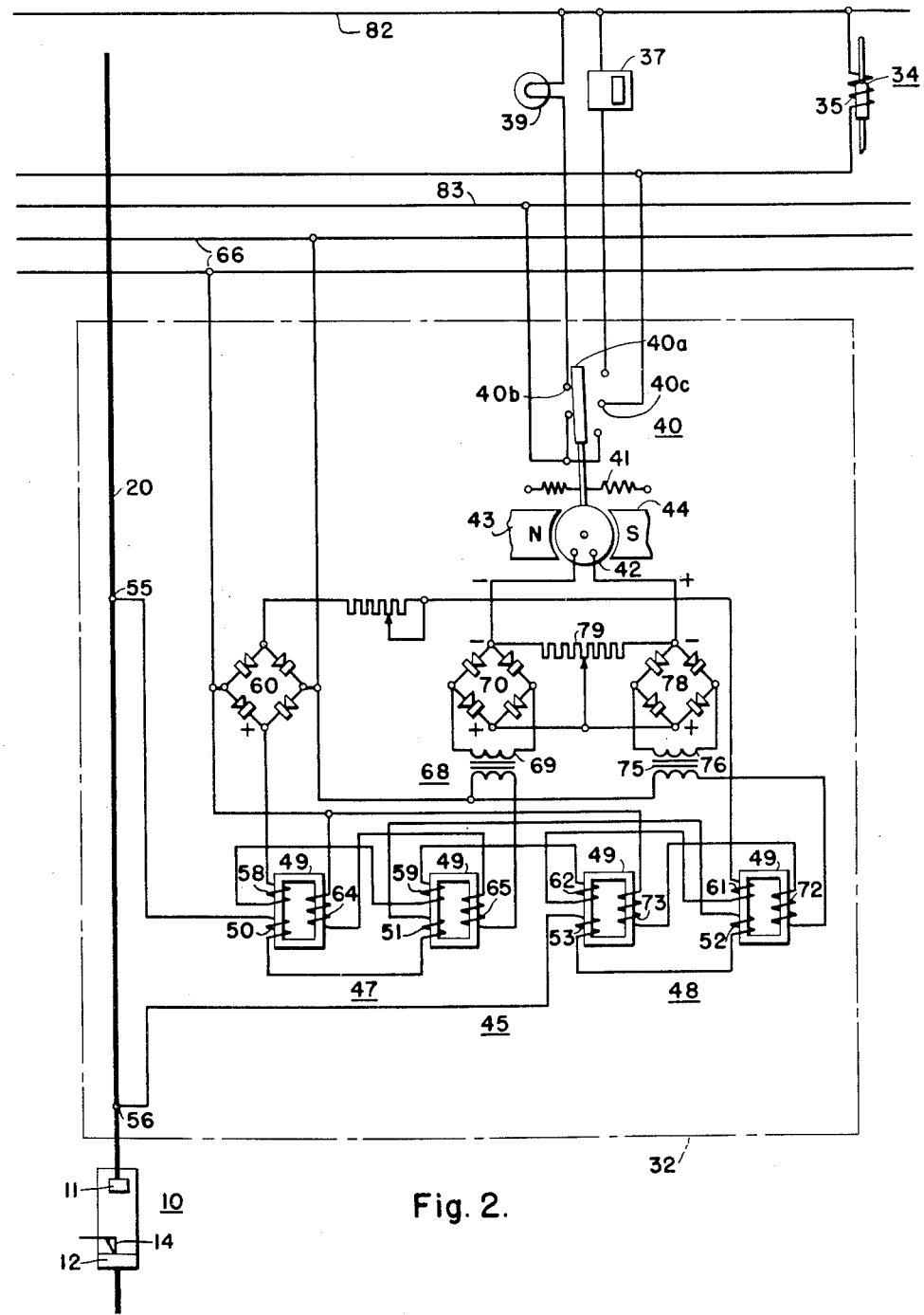

For a more complete understanding of the nature and scope of our invention, reference may be made to the following detailed description, which may be read in connection with the accompanying drawings in which:

Figure 1 is a diagrammatic view of a rectifier system embodying the invention in one of its forms, and Fig. 2 is a diagrammatic view of a portion of the system of Fig. 1 showing the circuit arrangement of the protective apparatus in detail.

Referring to Fig. 1 of the drawings, the reference numerals 10 may denote the several rectifiers of a polyphase rectifier system each having an anode 11 and a cathode 12, and a control electrode 14 which may be connected to any suitable type of control system well known in the art for controlling the periods of conductivity of the rectifier. The cathodes 12 may be connected by means of a cathode bus 15 and a cathode circuit breaker 16 to a direct-current load circuit connected between the negative conductor and the positive conductor 18. The anodes 11 may be connected by means of anode conductors 20 to the secondary windings 22 of a polyphase transformer 23, having primary windings 25 which are disposed to be connected by means of an alternating-current circuit breaker 26 to the conductors 27 of an alternating-current supply circuit. The circuit breakers 16 and 26 may be of any suitable type and may be provided with suitable closing means (either manual or automatic), which have been omitted for the purpose of simplifying the drawing. Each of the circuit breakers may be provided with suitable trip means 28 and 29 having trip coils 30 and 31, respectively.

In order to provide for disconnecting the rectifiers from the alternating-current and direct-current circuits whenever an arc-back occurs, each of the rectifiers may be provided with protective apparatus designated generally by the numeral 32 for effecting operation of a common trip relay 34, having an operating winding 35 and contact members 35a and 35b for connecting the trip windings 31 and 30 to a source of electrical energy for tripping the breakers 26 and 16. Each of the rectifiers may also be provided with a counter 37 and an indicating light 39, which are selectively energized under the control of the protective apparatus for indicating an arc-back or a misfire.

Referring to Fig. 2 of the drawing, it will be seen that each protective apparatus 32 may comprise a polarity-responsive relay 40, which may be normally biased by means of springs 41 to an intermediate position and is provided with a moving contact 40a disposed to be actuated by a movable operating element 42 disposed between opposed pole pieces 43 and 44. A polarity-responsive magnetic-amplifier circuit 45 is provided for producing a reversible direct-current voltage in accordance with the direction and amplitude of anode current in the anode conductor 20 for effecting operation of the relay 40.

The magnetic-amplifier circuit 45 may comprise a pair of magnetic amplifiers 47 and 48 each having a pair of magnetic cores 49 with a plurality of windings thereon. For example, control windings 50, 51, 52 and 53 may be connected in series-circuit relation to spaced points 55 and 56 on the anode conductor 20 so as to be energized in accordance with the value and direction of the anode current. Each of the core members 49 may be provided with a bias winding. The bias windings 58 and 59 of the magnetic amplifier 47 may be connected to a source of direct-current bias voltage such as the rectifier bridge circuit 60, cumulatively with respect to the control windings 50 and 51, while the bias windings 61 and 62 of the magnetic amplifier 48 may be connected differentially with respect to the control windings 52 and 53.

Alternating-current windings 64 and 65 may be oppositely disposed on the cores of the magnetic amplifier 47 so as to neutralize any inductive coupling with the control windings 50 and 51, being connected to a source of alternating current represented by the conductors 66 through a coupling transformer 68. The secondary winding 69 of the coupling transformer may be connected to a rectifier bridge circuit 70. The cores of the magnetic amplifier 48 may be provided with alternating-current windings 72 and 73 which are oppositely disposed relative to the control windings 52 and 53, and are connected to the alternating-current conductors 66 through a coupling transformer 75, the primary winding 76 of which is connected across a rectifier bridge circuit 78. These bridge circuits may be connected in opposed relation to a voltage divider 79, and to the operating coil 42 of the polarity-responsive relay 40 for operating the moving contact member 40 thereof in opposite directions in accordance with the direction of current flow in the anode conductor 20. For a normal direction of current flow, the voltage of the bridge circuit 70 exceeds that of bridge circuit 78, so that the right hand end of divider 79 is positive relative to the left-hand end, and the contact member 40a engages stationary contacts 40b to connect an indicating lamp 39 to a source of electrical energy, represented by conductors 82 and 83. Upon reversal of the direction of current flow in the anode conductor 20, the contact member 40a engages stationary contact members 40c to connect the operating winding 35 of the trip relay 34 to the conductors 82 and 83, and likewise connects the counter 37 to these conductors to count the arc-back which caused the reversal.

With the apparatus in the position shown in Fig. 1, the polarity-responsive relays 40 of each of the rectifiers 10 will be energized in accordance with the normal direction of current flow in the anode conductors 20 to provide an energizing circuit for each of the indicating lamps 39. Should an arc-back occur, reversal of anode current takes place in the anode conductor 20 of the faulted rectifier. This produces a change in the magnetic fluxes in the cores of the magnetic amplifiers 47 and 48, increasing the impedance of the alternating-current windings 64 and 65, while decreasing that of the alternating-current windings 72 and 73. The voltage across the rectifier bridge circuit 70 decreases, while that of the rectifier bridge circuit 78 increases. This causes a reversal in the voltage across the voltage divider 79, thus effecting operation of the moving contact member 40a of the polarity-responsive relay 40 to the right. This provides obvious energizing circuits for the counter 37 and the common trip relay 34. The trip coils 30 and 31 of the circuit breakers 16 and 26 are thereupon energized to open the circuit breakers and disconnect the rectifiers from both the alternating-current and direct-current systems.

From the above description and the accompanying drawings, it will be apparent that we have provided in a simple and effective manner for effecting high-speed tripping of the alternating-current circuit breaker and the cathode circuit breaker of a rectifier system, with the reliability and speed of clearing not being dependent on external circuit conditions. An integrated record of the arc-backs on each rectifier unit is obtained, thus facilitating proper maintenance of the individual units. Continuous supervision of the operation of each tank is obtained with visual indication of each misfire. A protective system embodying the features of our invention is simple and inexpensive to install and is reliable and effective in operation.

Since certain changes may be made in the above-described construction, and different embodiments of the invention may be made without departing from the spirit and scope thereof, it is intended that all the matter contained in the above description and shown in the accompanying drawings shall be considered as illustrative and not in a limiting sense.

We claim as our invention:

1. Protective apparatus for a rectifier having circuit breakers connecting it to alternating-current and direct-current circuits comprising, a magnetic amplifier having a magnetic circuit with a plurality of windings magnetically coupled therewith, a circuit connecting one of said windings to be energized in accordance with the current supplied to the rectifier from the alternating-current circuit, a relay, an additional circuit connecting said relay and another of said windings to a source of alternating current, and control means controlled by said relay for tripping said circuit breakers.

2. In protective apparatus for a direct-current circuit having a conductor connected by a circuit breaker to an adjacent circuit, a magnetic amplifier having a core of magnetic material with a plurality of windings magnetically linked therewith, circuit means connecting one of said windings to spaced-apart points on said conductor to be energized in accordance with the current in said conductor, a relay operable to effect tripping of the circuit breaker, and circuit means connecting the relay to a source of alternating current in series with another of said windings.

3. Protective apparatus for a rectifier system having at least one anode conductor connecting the rectifier to a source of alternating current through an alternating-current circuit breaker and a cathode conductor connecting the rectifier to a direct-current circuit through a cathode circuit breaker comprising, a pair of magnetic amplifiers each having a pair of cores of magnetic material with a plurality of windings thereon, a circuit connecting one winding of each core in series relation between spaced points on the anode conductor, circuit means including a rectifier device connecting another winding of each of the cores of each pair to alternating-current sources, a polarity-responsive relay, circuit means connecting the relay to said rectifier devices arranged in opposed relation, indicating means for indicating misfire of the rectifier, trip means operable to trip the breaker, and circuit means connecting the indicating means and trip means for selective control by said relay.

4. A rectifier system comprising, a rectifier, an alternating-current circuit breaker connecting the rectifier to a source of alternating current, a cathode breaker connecting the rectifier to a direct-current circuit, each of said breakers having trip means, a trip relay operable to energize said trip means and open the breakers, a polarity-responsive relay operable to connect the trip relay to a source of electrical energy for effecting operation thereof, a pair of magnetic amplifiers each having a pair of closed magnetic cores with a plurality of windings thereon, a circuit connecting one winding of each core to be energized in series in accordance with the current through the rectifier, a pair of rectifier circuits, a circuit connecting another winding of each core of said pairs to an alternating-current source including a coupling transformer connected to a different one of the rectifier circuits, and circuit means connecting the rectifier circuits in opposition in circuit with the polarity-responsive relay.

5. A rectifier system comprising, a rectifier having anode and cathode terminals, a circuit including a circuit breaker connecting the anode terminal to a source of alternating current, a circuit breaker connecting the cathode terminal to a direct-current circuit, a polarity-responsive magnetic-amplifier circuit energized to produce a reversible voltage in accordance with the direction and value of the rectifier current, a trip relay operable to trip both circuit breakers, a lamp, and a polarity-responsive relay energized from the magnetic amplifier circuit to selectively connect the lamp to a source of control voltage in response to a normal direction of current flow and connect the trip relay for operation in response to a reversal of rectifier current.

6. In a rectifier system, a plurality of rectifiers having anode and cathode terminals, a circuit breaker connecting the anode terminals to a source of alternating current, a transformer connected in circuit with the anode terminals and the circuit breaker, an additional circuit breaker connecting the cathode terminals to a direct current circuit, a common trip relay for both of said circuit breakers, a pair of magnetic amplifiers for each anode circuit having control windings connected to spaced-apart points on the anode circuit and having alternating-current and bias windings, a circuit connecting the bias windings of one amplifier cumulatively and those of the other differentially with respect to their control windings, circuit means including rectifier bridge circuits connecting the alternating-current windings of each pair to a source of alternating current, and a polarity-responsive relay individual to each anode circuit connected to be energized from the bridge circuits in opposed senses, said polarity-responsive relays being operable to effect operation of the trip relay in response to reversal of current in the anode circuit.

7. Protective apparatus for a rectifier system having a plurality of anode conductors for connection to an alternating-current circuit through a transformer and a circuit breaker and a cathode conductor for connection to a direct-current circuit through a circuit breaker comprising, a common trip relay for both of said circuit breakers, a pair of magnetic amplifiers associated with each anode conductor, each magnetic amplifier having a pair of cores of magnetic material with control, bias and alternating-current windings thereon, a circuit connecting the control windings of each pair of amplifiers in series to spaced points of the associated anode conductor, a circuit connecting the bias windings of one pair of cores cumulatively and of the other pair differentially with respect to the respective control windings, a circuit including a coupling transformer connecting the alternating-current windings of each pair of cores to an alternating-current source, a rectifier bridge circuit connected across eeach bridge circuit, a polarity-responsive relay for each anode conductor operable to effect operation of the trip relay, and a circuit connecting each such relay to the bridge circuits of its associated conductor in opposed relation.

8. In a rectifier system, a plurality of rectifiers each having a cathode and an anode connected by an anode conductor to a transformer, a circuit breaker connecting the transformer to a source of alternating current, another circuit breaker connecting the cathodes to a direct-current circuit, a trip relay common to both breakers, a pair of magnetic amplifiers for each rectifier each having a pair of cores of magnetic material with a plurality of windings thereon, a circuit connecting one winding of each core of each pair of amplifiers for energization in accordance with the anode current of its associated rectifier, circuits connecting another winding of each core of one amplifier of each pair to be energized cumulatively and one winding of each core of the other amplifier differentially with respect to their respective control windings, a pair of circuits each including a coupling transformer and rectifier bridge circuit connected thereto for connecting another winding of each core to an alternating-current source, a polarity-responsive relay, a circuit connecting the polarity-responsive relay to be energized from the rectifier bridge circuits in opposite senses, and circuit means including contacts of the polarity-responsive relay connecting the trip relay to a source of electrical energy.

9. In a protective system for a plurality of rectifiers having anodes connected to an alternating-current source through a transformer and a common circuit breaker and cathodes connected to a direct-current circuit by a cathode breaker, a pair of magnetic amplifiers for each rectifier connected in opposed relation to provide a reversible output dependent on the anode current, a trip relay common to both circuit breakers, a polarity-responsive relay for each rectifier, circuit means connecting the polarity-responsive relay of each rectifier to control the trip relay in accordance with a reversal of the anode current of the respective rectifier.

10. A rectifier system comprising, a plurality of rectifiers having anodes and cathodes, a transformer having primary windings and secondary windings connected to said anodes, a circuit breaker connecting the primary windings to an alternating-current source, a pair of magnetic amplifiers for each rectifier, said amplifiers being biased magnetically in opposite senses to produce voltages varying in opposite senses with variation of anode current, a common trip relay for said breaker, a polarity-responsive relay circuit means connecting said relay to be energized from said amplifiers in opposed senses, indicating means, and circuit means connecting the indicating means and the trip relay to be selectively energized in accordance with the polarity of the anode current.

References Cited in the file of this patent

UNITED STATES PATENTS

| | | |
|---|---|---|
| 2,128,162 | Morton et al. | Aug. 23, 1938 |
| 2,515,989 | Cox et al. | July 18, 1950 |